UNITED STATES PATENT OFFICE.

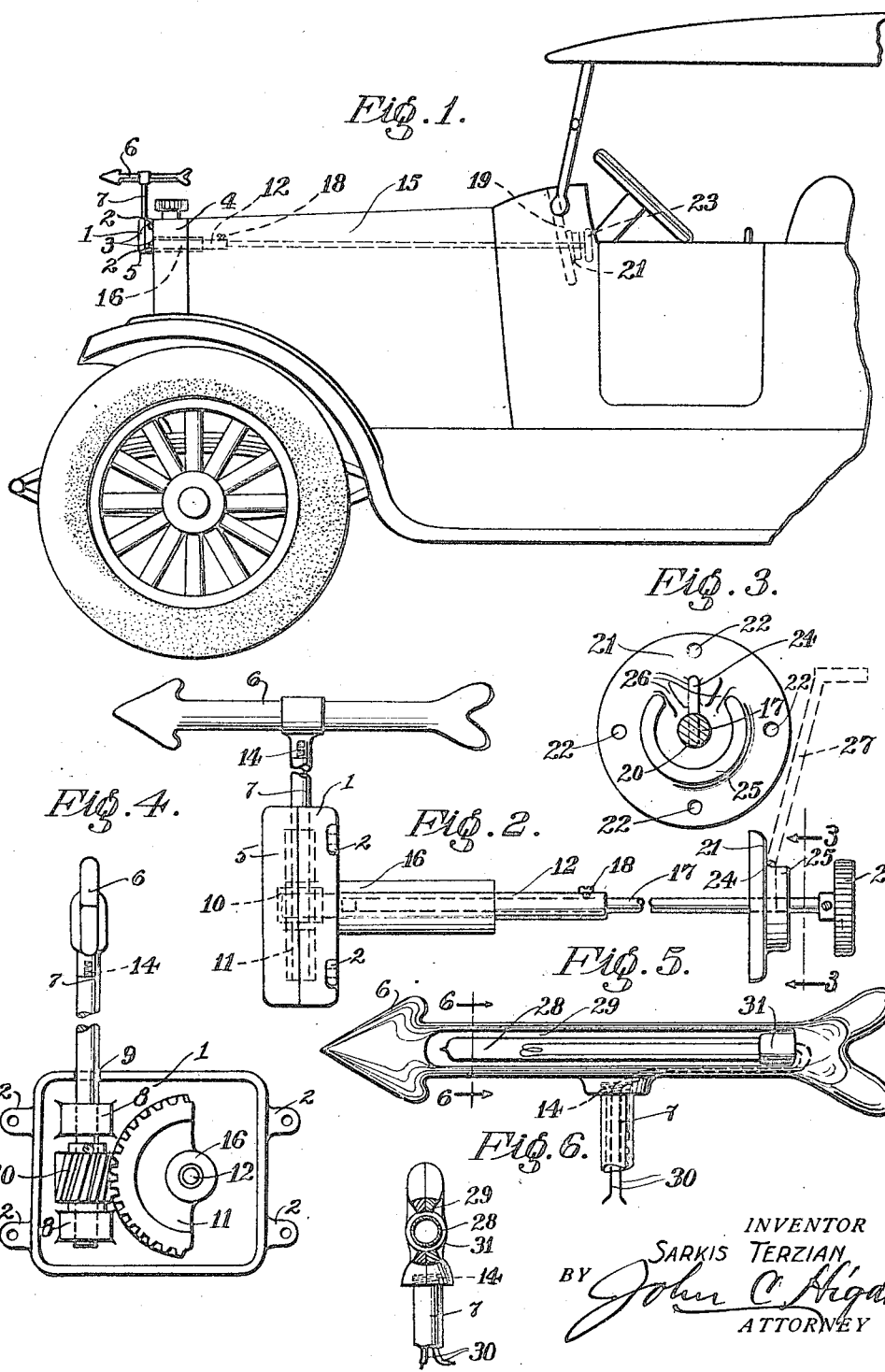

SARKIS TERZIAN, OF ST. LOUIS, MISSOURI.

AUTOMOBILE TRAFFIC-SIGNAL.

1,372,847.  Specification of Letters Patent.  Patented Mar. 29, 1921.

Application filed October 2, 1920. Serial No. 414,246.

*To all whom it may concern:*

Be it known that I, SARKIS TERZIAN, a citizen of the Republic of Armenia, residing at St. Louis, Missouri, have invented certain new and useful Improvements in Automobile Traffic-Signals, of which the following is a specification containing a full, clear, and exact description, reference being had to the accompanying drawings, forming a part hereof.

My invention consists in the novel construction and combination of parts hereinafter particularly described and distinctly claimed.

The object of my invention is to provide an improved automobile traffic signal, which shall be located on the front of the automobile radiator, and be operated by the driver of the automobile; which shall be simple and cheap in construction, as well as durable, reliable and efficient in operation; whereby the driver of an automobile in crowded streets may quickly turn said signal on the automobile to point to or indicate the direction (or turn) which the driver desires to make, and thereby notify the traffic policeman, as well as pedestrians and others, that said driver desires to (and will) turn his automobile in a certain direction, either to the right or to the left, or will go straight forward.

In the drawings,

Figure 1 is a side-elevation of the front portion of an automobile, having my invention applied thereto.

Fig. 2 is an enlarged detail side-elevation of the main operative parts of my invention, detached from the automobile; or before being applied thereto.

Fig. 3 is a detail elevation of the locking face-plate for the controlling-rod of the signal, the said rod being shown in section, and the section therethrough being taken on the line 3—3 of Fig. 2.

Fig. 4 is a front-elevation of the casing or box in which the operating gears are located, the cover of said casing being removed, to exhibit the internal arrangement of the gears.

Fig. 5 is a detail side-elevation of an electric-lighted arrow or pointer, and

Fig. 6 is a cross-section through same, on the line 6—6 of Fig. 5.

In carrying out my invention, in its present form, I construct a casing 1 of cast metal or other suitable material, and form it with perforated lugs 2, through the perforations of which common screws or bolts 3 are passed and connected to the front of the upper or tank-portion 4 of the automobile radiator, or to some other front part of the automobile in cases where the radiator is not at the front end of the machine.

Said casing 1 is provided with a removable cover or front portion 5, which will prevent the entrance of dust, rain or snow to the interior of said casing, and which is fastened in position by common means, so as to be easily detached when access is to be had to the interior of the casing, for oiling or repairing the parts contained therein.

A movable indicating-device, in the form of an arrow 6, is mounted to be turned or rotated in a horizontal plane upon the upper end of a vertical arrow-shaft 7 which is mounted in vertically-alined bearings 8 carried upon the interior of the said casing 1, and extends therefrom through an aperture 9 in the top wall of said casing. See Fig. 4.

A common worm or helical gear member 10 is fixed on said arrow-shaft 7 in said casing 1, in the space between the two bearings 8 of said shaft, and a helical gear-wheel 11 is fixed upon the front end of a horizontal operating-rod 12 in said casing, and the teeth of said worm 10 are in mesh with those of said gear-wheel 11, so that when said operating-rod is rocked or revolved in either direction the said gear members will cause the arrow-shaft and the arrow 6 to be turned in a corresponding direction.

The said indicating (or signaling) device 6 may be in any approved shape, and instead of being in the shape of an arrow, as herein shown, it may be in the form of a common human hand, with the index finger extended therefrom.

The said indicating or pointing device 6, is made detachable from the upper end of said arrow shaft 7, by being connected to said shaft by a common screw-joint 14, so that in making long tours upon country highways (where a traffic-signal is not needed) the said indicating or signaling member may be taken off and carried in the tool-box or other appropriate storage receptacle on the automobile.

In some cases the said casing 1 may be set sufficiently high upon said radiator 4 as to permit the said horizontal operating-rod 12 to be located above the radiator and above the hood 15 of the automobile; but in the present illustration said casing is set purposely so low upon said radiator that the said rod will pass rearwardly through the radiator and into the space beneath the said hood, so as to locate said pointing device 6 just a short distance above the top of the radiator, where it will be less liable to be accidentally broken off.

By the construction shown, the said operating-rod is covered and hidden from sight, except, at its rear end, which is exposed at a point convenient for the driver of the automobile.

A tubular-shank 16, Fig. 2, is formed integral with, or attached to, the rear side of said casing 1, and extends rearwardly through the said radiator in a horizontal position, and the front portion of said operating-rod 12 extends through said tubular-shank, and is protected thereby from contact therewith of the water contained in said radiator.

To provide for different lengths of automobile hoods, the said operating-rod 12 is made tubular, and a rear section 17 of said rod is located telescopically in said part 12, which I will hereinafter call the front section of the operating-rod.

Said rear section 17 may be secured in said front section at the desired adjustment by means of a common set-screw 18, which is threaded through said tubular front section into engagement with the said rear section.

The said rear section 17 of the said operating-rod extends rearwardly under the said hood 15 of the automobile or truck, to and through the dash 19, and to and through a central bearing 20 formed in a locking face-plate 21, which is secured to said dash (or to the cowl of the automobile) by means of common screws or bolts passed through apertures 22 in said face-plate, Fig. 3, so that the rear end of said operating-rod section 17 will project a slight distance in the rear of said face-plate.

A suitable knob or handle 23 is fixed upon the rear end of the said operating-rod section 17, at a point convenient for the driver of the machine; so that the driver may grasp said knob or handle and turn said rod section a slight distance in either direction, when it is desired to set the said pointing or signaling device 6.

A vertical locking-pin or lug 24 is fixed in or formed upon the said rear section 17 of the operating-rod, so as to extend laterally therefrom, and come into contact with the opposite adjacent ends of a circular stop-rib 25 that is struck up from or formed integral with the exposed rear face of the said face-plate 21, to limit the rocking movement of the said operating rod in both directions.

Said locking-pin 24 is adapted to spring into (or to be pushed into) any one of a series of radial notches or depressions 26 which are formed in the exposed rear face of said face-plate 21, at points intermediate of the adjacent ends of said circular stop-rib; so that when said locking-pin 24 is made to occupy the central one of said depressions, the said arrow or signaling device 6 will point straight ahead, and indicate to the traffic officer (or to all who observe it) that the driver of the car desires to proceed straight ahead; and so that when said locking-pin is placed in the extreme left-hand one of said depressions 26 the said arrow or pointing device 6 will be moved to point toward the left; and when said locking-pin is made to occupy the right-hand one of said depressions said pointing device will be correspondingly moved, to indicate that the driver desires to turn to the right.

In the application of my invention to some trucks, in which the driver's seat is located high, I provide a vertical extension 27 of the said rear-section 17 of the operating-rod, and (as indicated by dotted lines in Fig. 2) such extension is in the form of an elongation of the said locking-pin 24, in the present case, so that in such high-seated trucks the driver will not need to stoop much in order to reach the upper end of said extension.

In the modified form of the arrow or indicating device 6, shown in Figs. 5 and 6, an electric-lamp 28 of common construction is located horizontally in a horizontal opening 29 formed in said member 6, and secured in position by any well-known fastenings.

Electric current is supplied to the filament of said lamp 28 by means of the usual insulated conductors 30, which are connected to the usual terminals in the lamp-socket 31, and thence are led to a suitable battery or other source of electricity (not shown) through the vertical arrow-shaft 7, which is made tubular for that purpose.

The operation of my invention will be readily apparent without further description.

I do not limit myself to the exact form of the means herein shown for moving the said pointing-device 6, as same may be varied in several ways.

For instance, instead of moving the said vertical arrow-shaft by the means herein shown, the said shaft may be controlled by a common electric-motor, or by well-known forms of electro-magnets whose armature is connected to said shaft, and controlled by push-buttons or hand-levers, located convenient for the driver of the automobile.

I claim:—

An improved front-end automobile traffic-signal, comprising a gear-casing; a removable dust-proof cover for said casing; a tubular vertical signal-shaft and toothed-gears mounted in and supported by said casing, the latter having perforated supporting-ears; bolts passing through said perforated-ears and engaging the radiator, to support said casing on the front side of an automobile radiator; a pointer carrying an electric lamp and fixed upon the upper end of said vertical signal-shaft; electrical connections for said lamp, extending into and through said tubular shaft and thence into said casing; and means attached to the said toothed-gears in said casing and extending rearwardly to a point adjacent the automobile driver's seat, for rotating said signal-shaft.

SARKIS TERZIAN.

Witnesses:
　WINIFRED MCHALE,
　JOSEPH S. KALINOWSKI.